Patented June 6, 1939

2,161,749

UNITED STATES PATENT OFFICE 2,161,749

MOLDING PROCESS AND MATERIALS

Nicholas N. T. Samaras, Dayton, and Mark Plunguian, Chillicothe, Ohio, assignors to The Mead Corporation, Chillicothe, Ohio, a corporation of Ohio No Drawing. Original application June 29, 1935, Serial No. 29,168. Divided and this application February 4, 1939, Serial No. 254,682

6 Claims. (Cl. 106—39)

This invention relates to plastics and to plastic molding compositions and materials.

In the manufacture of paper or paper products from wood and other cellulose bearing materials the wood or the like is suitably treated to separate the cellulosic constituent thereof from the noncellulosic material. The former is used in the manufacture of paper and the latter, containing the greater part of the digestion chemical, is a spent liquor also including the noncellulosic portion of the original fibrous material. This invention is part of a recent development directed toward the recovery of usable values from this non-cellulosic material, and the production of new and valuable products therefrom.

This noncellulosic material as found in spent digestion liquors is the source of the product of this invention, and inasmuch as it is available in large quantities very inexpensively, it affords a commercially desirable source of supply for producing the material of this invention. Furthermore, the invention assists in solving the problem of disposal of this hitherto waste material. The composition of this non-cellulosic material is not definitely understood, but is known to be of complex organic nature and to include lignin and lignin degradation products. It is this lignin material which is suitably extracted and processed which is utilized in accordance with the teachings of this invention.

It is accordingly the principal object of this invention to utilize such waste material and to produce therefrom an inexpensive and valuable product particularly adapted for use in molding and in molding compositions.

It is a further object to provide a product for use in molding which is cheap, has good molding qualities, and which has satisfactory appearance, strength and resistance to water.

It is a further object to provide a binder material for use in molding which has a low melting point and which will thoroughly and uniformly coat and impregnate fibrous or other material with which it is used in the molding process.

It is a further object to provide a very satisfactory method of producing a material of this character and of utilizing it in the production of molded articles.

This application is a division of copending application Serial No. 29,168 filed June 29, 1935.

In accordance with this invention the spent digestion liquor containing the noncellulosic portion of the woody fibrous material is treated to recover therefrom a desired lignin product. This product should be as pure an organic substance as is obtainable therefrom and should particularly be free of organo-sodium compounds, and also free of sulfonic acid compounds, proprionic and acetic acids, and the like. The presence of inorganic material is usually found undesirable and the process is therefore preferably so carried out that the lignin product obtained has a low ash content and is otherwise in a pure state. Where the water obtainable has a high degree of hardness it is sometimes found that the inorganic materials producing this hardness are objectionable when not removed from the lignin product, and do not permit of obtaining the desired results when present. Under such circumstances it is found desirable either to utilize soft water or to so treat the separated lignin product as to remove these undesired inorganic materials therefrom.

It is also found desirable that the ash of the lignin material be preferably of a relatively neutral character, and not excessively alkaline. The presence of ash of high alkaline content has been found to be objectionable in obtaining a product having the characteristics desired.

The lignin material of this invention is obtained in the form of a light to dark brown or reddish mass which may be granulated upon drying. It has been found desirable in order to obtain the most desirable molding results that the lignin product have a limited melting point when in the dry state, correlated with the conditions to which it is subjected during the actual molding operation. The presence of the above noted impurities has been found to be objectionable as raising the melting point beyond the point which will produce satisfactory conditions in the mold. This is particularly the case with sulfonic acid compounds which have been found to so affect the melting characteristics that when present in appreciable amounts in lignin materials, the product exhibits practically no measurable melting point, but upon elevated temperature merely burns. It is important therefore in producing the material of this invention that the product be substantially free of materials of this nature which greatly increase its melting point characteristics.

The melting point for the purposes of this invention is conveniently obtained by placing a portion of the lignin material in a small glass tube having a fine bore. The end of the tube should be sealed if it is desired to assure that no change in the material will take place as a result of driving off volatile matter or when it is desired to obtain the melting point of the lignin in the presence of modifying agents. The tube is then placed in a bath of glycerin or the like and heat applied while the bath is constantly stirred. A thermometer placed in the bath close to the tube records the temperature, and the melting point is taken as that temperature at which the contents of the tube soften and turn black, finally completely liquefying. These steps usually occur successively within a relatively narrow temperature range so that the melting point can usually be obtained quite accurately.

It is preferred for the practicing of this invention to produce and use lignin material which has an oven dry melting point not substantially above 220° C. to 230° C. Preferably the melting point should be lower, of the order of 185° C. or below. By oven dry melting point is meant the temperature at which the material melts when it has been dried in an oven heated to sufficient temperature to drive off the moisture therefrom.

A material desired to act as a binder in the molding composition and having a melting point of the order of 185° C. to 230° C. is not in such condition as to produce the most satisfactory and uniform results. This follows from the fact that unless the lignin material melts at a relatively low temperature, within the temperature condition to which it is subjected within the precuring treatment or within the actual molding step itself, satisfactory mixture with the remaining materials and coating and impregnation of the fibrous or other filler material, are not readily obtained. It has been found in accordance with the present invention that if the lignin material of this character is utilized in the presence of a suitable modifying agent in predetermined amount, a very extraordinary and important change in its melting characteristics is produced. By the addition of a quantity of such modifying material in excess of an amount which has been found to be critical, the melting point characteristic is brought into a greatly reduced range wherein very satisfactory results in molding practice are obtained. Thus it has been found that as the proportion of such modifying agent is increased, there is a gradual decrease in the melting point until the critical proportion is reached, at which proportion there results a very sharp drop in the melting point characteristic. Further increase in modifying material produces only a limited additional decrease in melting point characteristics, and thus for practical purposes it is ordinarily desired to add such controlled proportion of such material as to carry the proportion slightly beyond the critical value.

This lowered and controlled melting point is very desirable for the following reasons. In preparing the molding compounds for use, the lignin material is mixed usually with a fibrous filler, and in some cases with additional thermoplastic or thermosetting resinous materials and with smaller amounts of lubricants, curing agents and the like. In preparing thermosetting molding compositions, the preferred practice in the use of the material of this invention is to thoroughly mix the ingredients, such as 50% filler, (i. e. wood flour, cotton linters, reclaimed tire fabric, asbestos, etc.), 25% phenol aldehyde, urea aldehyde or other thermosetting resin, and the remainder the lignin material (with suitable plasticizing, curing, lubricating agents, etc.) for a period of an hour or more, in a suitable apparatus such as a rod mill. Generally, the proportion of filler in the composition may vary over a rather wide range, such as from about 20% to 80% of the total, the remainder being the lignin material with or without additional resins and other materials. The dry mixed ingredients as discharged from the rod mill are then subjected to a hot milling or pretreating operation to effect a preliminary setting up of the resins. This step may comprise passing the mixed ingredients between a pair of polished rolls rotating at different speeds to produce an ironing effect and heated to a temperature of the order of 110° C. The molding compound should melt to some extent while on the rolls, and form a sheet, which is from time to time stripped off the rolls and again passed therebetween. In this operation, usually requiring only a few minutes, the materials become uniformly mixed and the lignin material becomes soft and liquid and uniformly coats and impregnates the individual particles of filler, and uniformly mixes with any other resin or other material present to form a composite homogeneous mass, having good flowability and plasticity and in which the fibers are suitably coated and impregnated with resulting satisfactory strength and water resistance.

It is important that such impregnation and melting with the resultant formation of a homogeneous mass be obtained in a relatively short time and without abnormal increase in temperature of the rolls on the mill. Thus it is desirable that the lignin melt under the pretreating conditions so that it will effectively act as a binder and not remain inert to act in the nature of a filler material, and that this melting take place at a sufficiently low temperature and in a sufficiently short length of time that the reaction or curing of the other resin present does not proceed too far. If the milling conditions are too severe, that is, if the time of milling is too long or the temperature of milling is too high, the cure of the thermosetting resin that is used with the lignin will proceed too far and this will result in a decrease in plasticity of the resulting product. When a properly mixed mass is obtained upon the mill, the pretreated product may be then suitably ground, such as to about 14 mesh, and will produce highly satisfactory results in the actual molding operation. The lignin having been melted coats and impregnates the fibrous material and produces a homogeneous mass, thereby affording increased water resistance since individual fibers are not exposed but are covered up and impregnated by the lignin material. For the same reasons the strength characteristics and flowability of the product are improved, and the finished product has the desired appearance of a polished shiny surface. The composition may be molded at the pressures and temperatures customary in this art, such as from about 2000 to 6000 pounds per square inch and at temperatures of about 140° C. to 180° C., and may be given a suitable cure time such as customarily used in molding practice.

The same considerations apply in the carrying out of the molding operation without a preliminary premilling operation. In such cases it is desirable that the lignin product have such melting point and other characteristics that when subjected to heat and pressure in the mold, of the order customarily used, the lignin will have suitable flowability and plasticity and will become sufficiently liquid to afford the desired homogeneous intermixture, so that it will coat and impregnate the fibrous material, covering up the exposed ends thereof to reduce water absorption and to provide increased strength. By thus controlling the melting point, the lignin material is made to function primarily as a binder intimately associating and uniting with the other constituents, and not merely as an inert material in the nature of a filler material.

This is particularly desirable in thermoplastic molding where the lignin material may be used as the sole binder, with or without filler, or may be admixed with other thermoplastic resinous material, such for instance as shellac, furfural-phenol resins, casein, cellulose acetate, and the like. A typical composition of this character comprises for example 10 parts by weight of filler, 5 parts shellac and 5 parts lignin material. This composition may be satisfactorily molded at a temperature of 155° C. and a pressure of 4000 pounds per square inch. The material is given a cure time of 2 or 3 minutes and the mold cooled to about 75° C. before releasing. Where no preliminary milling of the ingredients is utilized, it is important that the desired impregnation and formation of a homogeneous mass take place under the molding conditions, and within a limited length of time to obtain the product desired.

The modifying agent found to produce entirely satisfactory results in effecting control of the melting point characteristics of the lignin is water. When moisture is present with a lignin having the oven dry melting point and other characteristics as described above, in an amount in excess of the critical value, the resulting lignin product has the very much reduced melting point described. For example, when from about 8% to 12% or more of moisture material is present in the lignin material of this invention, the melting point thereof drops abruptly and rapidly below its oven dry melting point and within a range where very satisfactory results in molding are secured. For example in using a ligning material which had a melting point of 203° C. oven dry, the presence of 7.5% moisture effected a reduction in melting point to 192° C. The presence of 12% moisture, in excess of the critical amount, reduced the melting point to 125° C. When a larger quantity of moisture was used, such as up to 20% or 25%, a further reduction of the melting point to approximately 110° C. was obtained. In another case, using a lignin having an oven dry melting point of 148° C., the presence of 2% moisture effected a reduction in melting point to 143° C. The presence of 13.4% moisture, in excess of the critical amount, reduced the melting point to 72° C. These percentages and temperature ranges are given as illustrative of typical lignin products and it will be understood that with different types of lignin material the exact quantity of the modifying material to be used to bring the lignin within the critical range as regards the melting point, will vary to some extent.

Water is particularly desirable for use as a modifying material on account of its cheapness. Also the lignin may be so produced that it is not completely dried, leaving the desired proportion of moisture, above the critical value, incorporated therein. Alternatively the moisture may be reintroduced into a dried lignin in the proper controlled amount.

When water is present in large amount with the molding composition, it is sometimes found that undesirable blistering has a tendency to occur and in such case the mold should be gassed, as by momentarily releasing the pressure to allow escape of the steam without blistering the molded product. Where, however, a premilling operation takes place, the greater part of the water is usually driven off, and quantity remaining in the molding powder is generally not such as to produce objectionable blistering. For example, in several instances tests showed the presence of approximately four percent moisture in the compound at the completion of the premilling treatment.

If desired, suitable hygroscopic materials may be added to the lignin in order to conserve the moisture content thereof. Thus for example a solution of glycerin may be added in the proportion of 2 cc. of a 30% solution to ten grams of dry lignin material, and such addition is found to reduce loss of moisture and to conserve the moisture content of the lignin. It is preferable to use an organic rather than an inorganic hygroscopic material to avoid addition of such inorganic material and consequent increase in ash content.

Where the lignin material is deficient in moisture, it has been found that similar satisfactory results in molding are obtained through the utilization of predetermined amounts of furfural, as the modifying agent. When present with the lignin in excess of the critical proportion, (of the order of 12%), it also produces the desired reduction in melting point characteristics, and where the materials are molded without a premilling treatment, the furfural is present directly in the mold with the lignin material. It is probable that under the molding conditions a condensation reaction takes place to some extent with the production of a reaction product. In the case where the materials are hot milled preliminary to the molding operation it is probable that the greater part of the furfural is volatilized or lost during such milling operation under such circumstances of temperature and the like that there is little possibility of a condensation reaction taking place. Small quantities of the furfural may, however, remain in the milled material and may produce a condensation reaction with the lignin and/or any other additional resin present in the composition under the actual molding conditions. Similarly furfural or other suitable aldehydes together with catalysts therefor may be added to the precured materials for effecting a condensation reaction in the molding operation.

It has also been found that by a process of fractionating a suitable lignin, such as one having an oven dry melting point not in excess of 220° C. to 230° C. as described above, a lignin product can be obtained with a much lower melting point, such as to be usable directly without the addition of a modifying material. Thus by dissolving such lignin material in acetone and then pouring the solution into a large volume of ether, a fraction comprising approximately one half of the lignin is precipitated, leaving in solution a fraction which upon recovery from solution is found to have a low oven dry melting point, of the order of 70° C. for example, and to give very satisfactory results in molding. It is ordinarily preferred however to utilize the method heretofore described above in view of its greater yield and economy.

As outlined above, a number of different sources of lignin material are available in the spent digestion lignin resulting from different chemical digestion and pulping processes, and the desired characteristics of the lignin product for subsequent utilization according to the teachings of this invention are set forth. The particular methods for obtaining a product of this character from the different types of spent digestion liquor will vary, in accordance with the character of the liquor, the presence of organic compounds, inorganic material, and the like. The following is a typical example of a preferred process for producing the material of the present invention as carried out upon the spent digestion liquor or black liquor resulting from the so-called soda process. In producing the lignin material of this invention, the black liquor is treated with carbon dioxide gas to effect a precipitation and suspension of the lignin material thereof in the liquor which is subsequently collected and freed of organo-sodium and other undesired compounds.

The following is given as illustration of the practicing of this process on a semi-plant scale. Ten drums of concentrated black liquor, as obtained after passing through the first and second stage evaporators in the usual recovery system are diluted to 2000 gallons with tap water. Stack gas is then bubbled through the liquor, the gas being enriched by $CO_2$ if found necessary. Thus in one typical example an analysis of stack gas showed about 4% carbon dioxide, and with this low concentration of carbon dioxide it was found that the particles of lignin as produced were extremely fine and difficult to coagulate without the use of elevated temperature. When, however, the proportion of carbon dioxide was increased up to approximately 10% or above, the particle size was sufficiently large that coagulation resulted within the desired temperature range, and fine dispersion of the lignin particles was avoided.

The gas was introduced until the liquor had a pH value of between 8.0 and 8.3, this usually taking from about 36 to 42 hours or thereabouts. Under these conditions the lignin material was present in suspension in the liquid. During this operation the temperature of the liquor was prevented from rising as a result of the stack gases, and was maintained at substantially room temperature by a suitable cooler. No stirring was found necessary except to keep down the foam on top of the tank.

To facilitate subsequent filtration and recovery of the suspended particles the liquor was then placed in a second tank and heated by a steam coil to a temperature sufficient to cause coagulation, air being introduced continually from jets in the lower portion of the tank to produce agitation and to prevent the settling of the suspension in the bottom of the tank. Where a very fine dispersion of the lignin particles was obtained, as where a gas was used containing a very low proportion of carbon dioxide, it was found that it was necessary to heat the liquor to approximately 85° C. in order to effect such coagulation of the suspended particles as to permit of ready filtering. Such coagulation temperature, however, was found undesirable for the reason that the mass had a tendency to become gummy and difficult to handle when heated to this point; and further because a relatively hard tap water was used and this temperature of coagulation seemed to cause the hardness to precipitate out of the water in the form of inorganic compounds which became intimately associated with the lignin in suspension, and which were very difficult to subsequently remove, their presence being objectionable and resulting in producing a lignin having an abnormally high melting point. When, however, the lignin material was precipitated in a larger state of subdivision, as by the use of a gas richer in carbon dioxide, it was found that satisfactory coagulation could be effected at temperatures of the order of 60° C. At this temperature no difficulty in handling the lignin material itself was experienced, and the hardness in the water did not tend to objectionably precipitate out.

The liquor was then cooled to substantially room temperature, agitation being maintained throughout to maintain the precipitate in suspension, this cycle of heating and cooling requiring approximately 24 hours with the apparatus used. The liquor was then filtered in a filter press and the lignin material separated therefrom and washed. Where the water is particularly hard, it is found desirable to wash the lignin with soft water, or to use softened water throughout the entire process.

In order to free the lignin material of undesired organic compounds, such as organo-sodium compounds and the like, it is then washed with a dilute solution of an acid, such for instance as a 2% to 5% solution of sulfuric or hydrochloric acid in an amount slightly in excess of the amount required for neutralization. Following the acid wash, it is again washed with water, preferably soft water, to wash out the remaining acid, and is then found to be in the substantially pure state and very low in ash as desired. Air may be run through the filter press to force out as much water as possible, and the lignin is then removed from the press and oven dried at a moderate temperature to provide the product as described above. It is preferable to effect the drying of the lignin at a temperature below its fusing point as the drying of the lignin at such temperature as to cause fusing thereof is found to deprive it of its water resistant properties and to make it quite water soluble.

While the processes and products herein described constitute preferred embodiments of the invention, it is to be understood that the invention is not limited to these precise processes and products, and that changes may be made therein without departing from the scope of the invention which is defined in the appended claims.

What is claimed is:

1. The method of preparing a molding material having a low melting point characteristic and adapted to flux and coat the surface of fibrous material when heated to temperatures suitable for fluxing thermosetting resinous materials which comprises treating a lignin material which has an oven dry melting point of not substantially above 220° C. to 230° C. with furfural as a modifying agent in excess of about 8% to 12% thereof to bring about a substantial reduction in the melting point of the lignin.

2. The method of preparing a molding material having a low melting point characteristic and adapted to flux and coat the surface of fibrous material when heated to temperatures suitable for fluxing thermosetting resinous materials which comprises treating a lignin material substantially free of non-fluxing sulfonic acid compounds with furfural as a modifying agent in excess of the critical proportion thereof of the order of 8% to 12% to bring about a substantial reduction in the melting point of the lignin.

3. A moldable lignin material of the character described comprising a lignin material substantially free of non-fluxing sulfonic acid compounds, said lignin having incorporated therewith in excess of about 8% to 12% of furfural as a modifying agent adapted to substantially reduce the melting point of the lignin material.

4. A moldable lignin material of the character described comprising a lignin material substantially free of non-fluxing sulfonic acid compounds and having an oven dry melting point not substantially above 220° C. to 230° C., said lignin having a melting point lowered substantially below said oven dry melting point resulting from incorporation therewith of in excess of the critical proportion of the order of 8% to 12% of furfural as a melting point modifying material.

5. A binder material for use in molding comprising a fluxable thermosetting resin and a lignin material substantially free of non-fluxing sulfonic acid compounds and having an oven dry melting point not substantially in excess of 220° C. to 230° C., said lignin material having a melting point lowered substantially below said oven dry melting point resulting from incorporation therewith of in excess of the critical proportion of the order of 8% to 12% of furfural as a melting point modifying agent adapted to reduce the melting point of the lignin material to a value suitable for incorporation with said thermosetting resinous material.

6. The method of preparing a molding material which comprises mixing together a fibrous filler and a lignin material in the presence of in excess of about 8% to 12% furfural as a modifying agent adapted to bring about a substantial reduction in the melting point of the lignin, preliminarily heating and precuring the mixed fibrous filler and lignin material to such temperature as to secure fluxing of the lignin material with resultant impregnation and coating of the fibrous filler therewith, and thereafter molding such precured composition under elevated temperature and pressure.

NICHOLAS N. T. SAMARAS.
MARK PLUNGUIAN.